(12) United States Patent
Griffith

(10) Patent No.: US 9,139,293 B2
(45) Date of Patent: Sep. 22, 2015

(54) OPTIMIZED REAL-TIME ANTISKID CONTROL INITIALIZATION FOR TRAVEL SURFACES AS A FUNCTION OF WHEEL SPINUP

(71) Applicant: THE BOEING COMPANY, Chicago, IL (US)

(72) Inventor: Thomas Todd Griffith, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/161,492

(22) Filed: Jan. 22, 2014

(65) Prior Publication Data

US 2015/0203194 A1 Jul. 23, 2015

(51) Int. Cl.
*B60B 39/00* (2006.01)
*B64C 25/46* (2006.01)
*B60T 8/17* (2006.01)
*B60T 8/176* (2006.01)

(52) U.S. Cl.
CPC ............... *B64C 25/46* (2013.01); *B60T 8/1703* (2013.01); *B60T 8/176* (2013.01)

(58) Field of Classification Search
None
See application file for complete search history.

(56) References Cited

U.S. PATENT DOCUMENTS

| 6,704,634 | B1* | 3/2004 | Gowan et al. | 701/70 |
| 7,717,527 | B1 | 5/2010 | Griffith | |
| 8,134,362 | B1* | 3/2012 | Hullender et al. | 324/300 |
| 2004/0193386 | A1* | 9/2004 | Flynn et al. | 702/173 |
| 2008/0084109 | A1* | 4/2008 | Griffith et al. | 303/89 |
| 2012/0016575 | A1* | 1/2012 | White | 701/123 |

FOREIGN PATENT DOCUMENTS

| GB | 764788 A | 1/1957 |
| WO | 2009089551 A2 | 7/2009 |

OTHER PUBLICATIONS

Extended European Search Report, Application No. 14198373.4-1756, May 26, 2015.

* cited by examiner

*Primary Examiner* — Adam Alharbi
(74) *Attorney, Agent, or Firm* — Vista IP Law Group LLP; Cynthia A. Dixon

(57) ABSTRACT

Systems, methods, and apparatus for optimizing real-time antiskid control initialization for a vehicle on a travel surface are disclosed. In one or more embodiments, a method involves determining when at least one wheel of the vehicle touches ground. The method further involves calculating a rate of wheel spin up for at least one wheel. Also, the method involves determining whether the rate of wheel spin up exceeds a wheel spin up rate threshold. In addition, the method involves applying a high level of brake force when the rate of wheel spin up exceeds the wheel spin up rate threshold, and applying a low level of brake force when the rate of wheel spin up does not exceed the wheel spin up rate threshold.

11 Claims, 4 Drawing Sheets

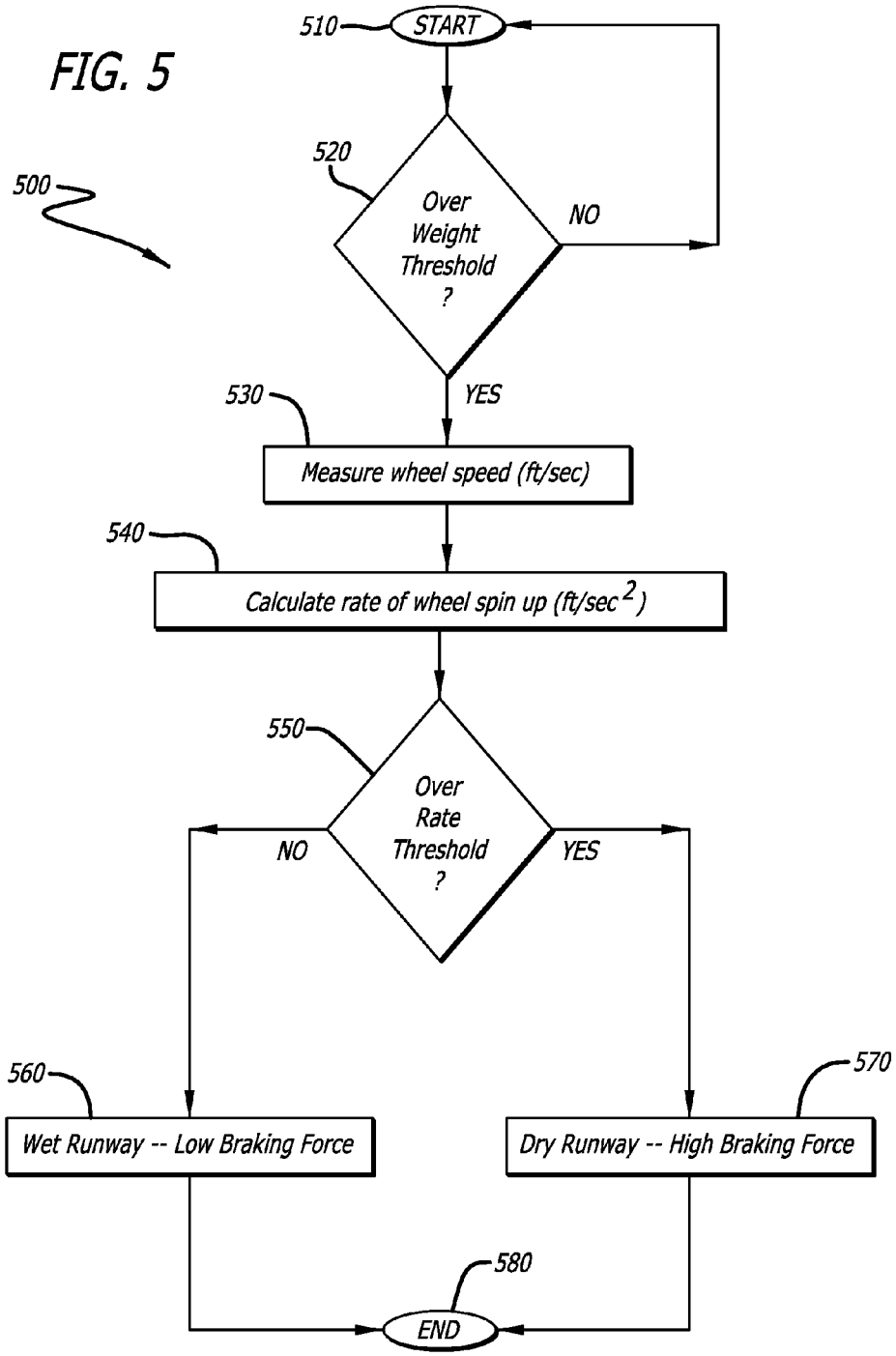

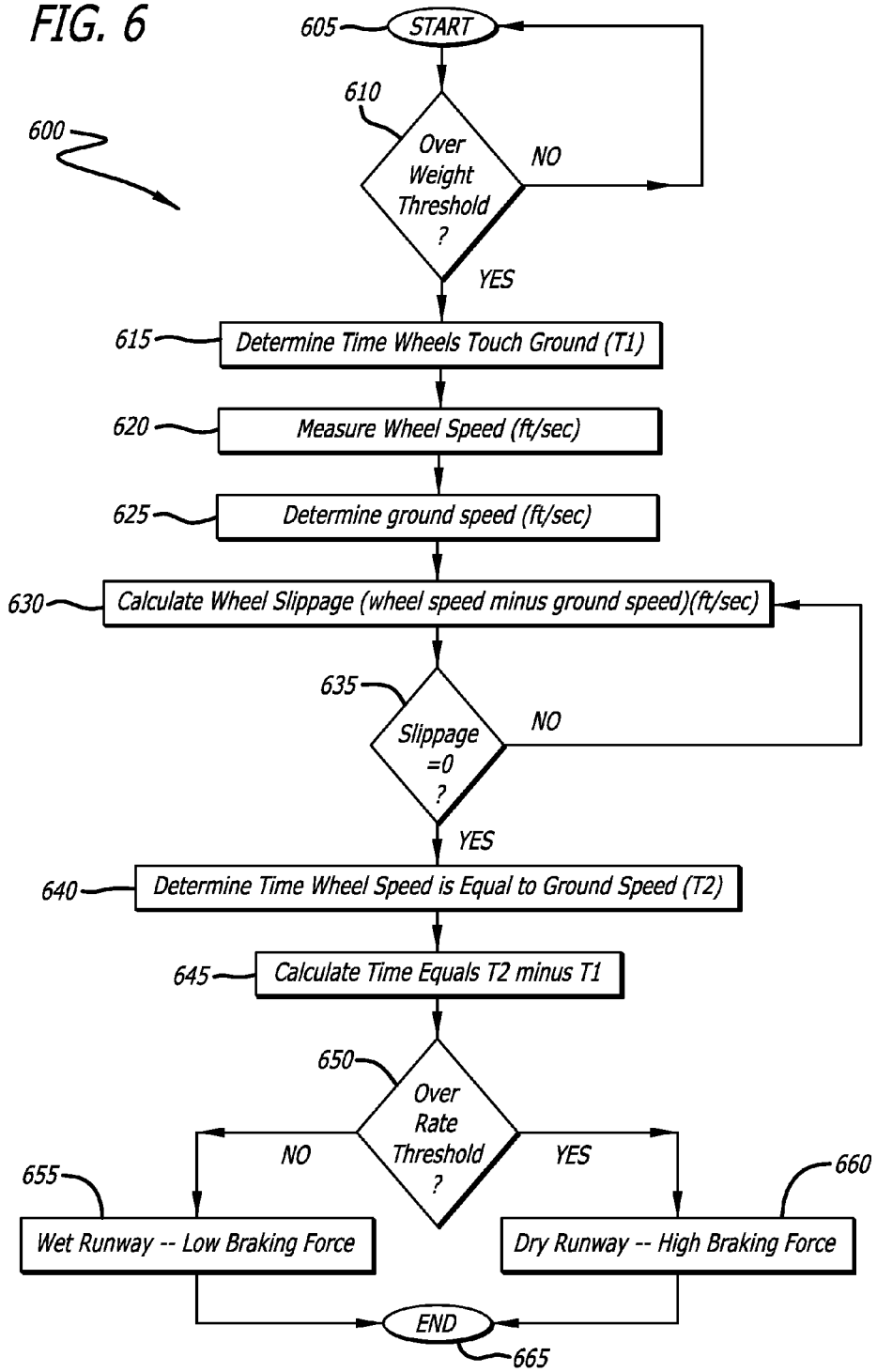

OPTIMIZED REAL-TIME ANTISKID CONTROL INITIALIZATION FOR TRAVEL SURFACES AS A FUNCTION OF WHEEL SPINUP

FIELD

The present disclosure relates to optimized antiskid control initialization. In particular, it relates to real-time antiskid control initialization for vehicles on travel surfaces a function of wheel spinup.

BACKGROUND

Currently, existing vehicle antiskid control initialization is optimized for dry travel surfaces due to the lack of input to indicate what the real-time travel surface condition (e.g., the coefficient of friction (μ)) may be under other conditions, such as during rain, snow, ice, or contamination. This leads to a less than optimized wet/contaminated runway performance because the antiskid control will take longer to initialize in other than dry travel surface conditions. The present disclosure allows for the selection of the appropriate antiskid control initialization based on the real-time condition of the travel surface, for example detected during touchdown and de-rotation of the wheels of an aircraft.

SUMMARY

The present disclosure relates to a method, system, and apparatus for optimized antiskid control initialization for travel surfaces as a function of wheel spinup of a vehicle. In one or more embodiments, a method for optimizing real-time antiskid control initialization for a vehicle on a travel surface involves determining, with at least one processor, when at least one wheel of the vehicle touches ground. The method further involves calculating, with at least one processor, a rate of wheel spin up for at least one wheel. Also, the method involves determining, with at least one processor, whether the rate of wheel spin up exceeds a wheel spin up rate threshold. In addition, the method involves applying, with at least one brake for at least one wheel, a high level of brake force, when the rate of wheel spin up exceeds the wheel spin up rate threshold. Further, the method involves applying, with at least one brake for at least one wheel, a low level of brake force, when the rate of wheel spin up does not exceed the wheel spin up rate threshold.

In one or more embodiments, the determining of when at least one wheel of the vehicle touches the ground involves determining, with at least one wheel sensor, a weight on at least one wheel; and determining, with at least one processor, whether the weight on at least one wheel exceeds a weight threshold. In at least one embodiment, the weight threshold is related to a size of the vehicle.

In at least one embodiment, the method further involves measuring, with at least one wheel sensor, a speed of at least one wheel. In some embodiments, the calculating of the rate of wheel spin up involves at least one processor using the speed of at least one wheel.

In one or more embodiments, the wheel spin up rate threshold is around 1000 feet per second squared (ft/sec$^2$). In at least one embodiment, the high level of brake force is about 1500 to 3000 pounds per square inch (psi). In some embodiments, the low level of brake force is about 300 to 1500 psi. In one or more embodiments, the vehicle is an aircraft or a space plane. In some embodiments, at least one brake is a forward brake and/or an aft brake.

In at least one embodiment, a system for optimizing real-time antiskid control initialization for a vehicle on a travel surface involves at least one processor to determine when at least one wheel of the vehicle touches ground, to calculate a rate of wheel spin up for at least one wheel, and to determine whether the rate of wheel spin up exceeds a wheel spin up rate threshold. The system further involves at least one brake, for at least one wheel, to apply a high level of brake force when the rate of wheel spin up exceeds the wheel spin up rate threshold, and to apply a low level of brake force when the rate of wheel spin up does not exceed the wheel spin up rate threshold.

In one or more embodiments, to determine when at least one wheel of the vehicle touches the ground involves at least one wheel sensor to determine a weight on at least one wheel, and at least one processor to determine whether the weight on at least one wheel exceeds a weight threshold.

In at least one embodiment, the system further involves at least one wheel sensor to measure a speed of at least one wheel. In some embodiments, to calculate the rate of wheel spin up involves at least one processor using the speed of at least one wheel.

In one or more embodiments, a method for optimizing real-time antiskid control initialization for a vehicle on a travel surface involves determining, with at least one processor, a time T1 when at least one wheel of the vehicle touches ground. The method further involves determining, with at least one processor, a time T2 when a speed for at least one wheel is equal to a ground speed. Also, the method involves calculating, with at least one processor, a total time T by subtracting the time T2 minus the time T1. In addition, the method involves determining, with at least one processor, whether the total time T exceeds a time threshold. Additionally, the method involves applying, with at least one brake for at least one wheel, a high level of brake force, when the total time T exceeds the time threshold. Further, the method involves applying, with at least one brake for at least one wheel, a low level of brake force, when the total time T does not exceed the time threshold.

In at least one embodiment, the method further involves measuring, with at least one wheel sensor, the speed for at least one wheel. In some embodiments, the method further involves determining, with at least one processor, the ground speed.

In one or more embodiments, the determining of the time T1 when at least one wheel of the vehicle touches the ground involves determining, with at least one wheel sensor, a weight on at least one wheel; and determining, with at least one processor, whether the weight on at least one wheel exceeds a weight threshold. In one or more embodiments, the time threshold is around 0.5 seconds (sec).

In at least one embodiment, a system for optimizing real-time antiskid control initialization for a vehicle on a travel surface involves at least one processor to determine a time T1 when at least one wheel of the vehicle touches ground, to determine a time T2 when a speed for at least one wheel is equal to a ground speed, to calculate a total time T by subtracting the time T2 minus the time T1, and to determine whether the total time T exceeds a time threshold. The system further involves at least one brake, for at least one wheel, to apply a high level of brake force when the total time T exceeds the time threshold, and to apply a low level of brake force when the total time T does not exceed the time threshold.

In one or more embodiments, the system further involves at least one wheel sensor to measure the speed for at least one wheel. In at least one embodiment, at least one processor is further to determine the ground speed.

In at least one embodiment, to determine the time T1 when at least one wheel of the vehicle touches the ground involves at least one wheel sensor to determine a weight on at least one wheel, and at least one processor to determine whether the weight on at least one wheel exceeds a weight threshold.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 5 is a flow chart for the disclosed method for optimized antiskid control initialization for dry and wet runways as a function of wheel spinup, that uses the rate of wheel spin up to estimate the runway condition, in accordance with at least one embodiment of the present invention.

FIG. 6 is a flow chart for the disclosed method for optimized antiskid control initialization for dry and wet runways as a function of wheel spinup, that uses the time of wheel spin up to estimate the runway condition, in accordance with at least one embodiment of the present invention.

DESCRIPTION

Figure 1:
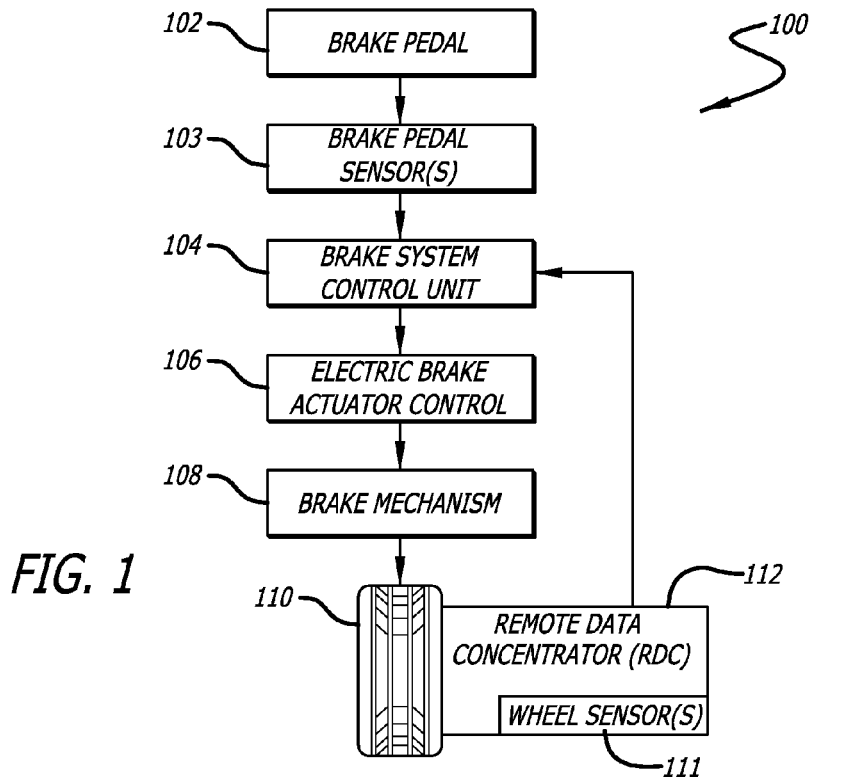
FIG. 1 is a schematic representation of a portion of an electric brake system suitable for use in an aircraft (i.e. a vehicle) that may be employed by the disclosed system for optimized antiskid control initialization for dry and wet runways as a function of wheel spinup, in accordance with at least one embodiment of the present invention.

The methods and apparatus disclosed herein provide an operative system for optimized, real-time antiskid control initialization for travel surfaces in varying conditions, as a function of data for wheel spinup of the vehicle. The disclosed system provides a solution that monitors the wheel speed data of the vehicle, for example, during the touchdown and de-rotation portion of an aircraft landing (i.e. the lowering of the nosewheel of the aircraft to the runway following the main gear touchdown), and then based on that information, selects the appropriate antiskid control initialization for the condition of the travel surface.

As previously mentioned above, existing vehicle antiskid control initialization is optimized for dry travel surfaces, due to the lack of input to indicate the real-time conditions. Wet and/or contaminated travel surfaces have lower friction coefficients. Failure to adjust for varying surface conditions can result in a delay in the initialization of the antiskid controller, which in turn can result in releasing brake pressure too soon and/or failing to adequately control excessive wheel skid.

The system of the invention allows for the determination of the appropriate antiskid control initialization-based on the real-time condition of a travel surface (e.g., a wet or dry runway) before braking, detected by wheel spinup on the surface, for example during touchdown and de-rotation of an aircraft.

In particular, the system of the invention determines real-time travel surface conditions (e.g., whether the surface is wet or dry) by using wheel speed data. By determining the real-time surface conditions based on the wheel speed data, the system allows for the ability to select for the appropriate antiskid control initialization on a real-time, "as needed" basis. As such, the system is able to determine travel surface conditions (e.g., characteristics of a runway surface) in order to properly initiate antiskid action, and to inform the vehicle's driver or pilot or autopilot, and vehicle controls accordingly. Thus, the disclosed system enhances the safety of landing, improves the antiskid control system performance, and increases the life of the tires of a vehicle, thereby decreasing needed maintenance expense and time.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the invention may be described herein in terms of functional and/or logical block components and various processing steps. It should be appreciated that such block components may be realized by any number of hardware, software, and/or firmware components configured to perform the specified functions, including "off the shelf" components. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to structural elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic representations shown in the figures depict example arrangements of elements, additional intervening elements, devices, features, or components may be present in an embodiment of the invention.

FIG. 1 is a schematic representation of a portion of an electric brake system 100 of the invention suitable for use in an aircraft (not shown). Electric brake system 100 includes a brake pedal 102, a brake system control unit (BSCU) 104 coupled to brake pedal 102, an electric brake actuator control (EBAC) 106 coupled to BSCU 104, and a brake mechanism 108 coupled to EBAC 106. Brake mechanism 108 corresponds to at least one wheel 110 of the aircraft. Electric brake system 100 may also include an axle-mounted remote data concentrator (RDC) 112 coupled to wheel 110. Briefly, BSCU 104 reacts to manipulation of brake pedal 102 and generates control signals that are received by EBAC 106. In turn, EBAC 106 generates brake mechanism control signals that are received by brake mechanism 108. In turn, brake mechanism 108 actuates to slow the rotation of wheel 110. These features and components are described in more detail below.

Electric brake system 100 can be applied to any number of electric braking configurations for an aircraft, and electric brake system 100 is depicted in a simplified manner for ease of description. An embodiment of electric brake system 100 may include a left subsystem architecture and a right subsystem architecture, where the terms "left" and "right" refer to the port and starboard of the aircraft, respectively. In practice, the two subsystem architectures may be independently controlled in the manner described below. In this regard, an embodiment of electric brake system 100 as deployed may include a left brake pedal, a right brake pedal, a left BSCU, a right BSCU, any number of left EBACs coupled to and controlled by the left BSCU, any number of right EBACs coupled to and controlled by the right BSCU, a brake mechanism for each wheel (or for each group of wheels), and an RDC for each wheel (or for each group of wheels). In operation, the electric brake system can independently generate and apply brake actuator control signals for each wheel of the aircraft or concurrently for any group of wheels.

Brake pedal 102 is configured to provide pilot input to electric brake system 100. The pilot physically manipulates brake pedal 102, resulting in deflection or movement (i.e., some form of physical input) of brake pedal 102. This physical deflection is measured from its natural position by a hardware servo or an equivalent component, converted into a BSCU pilot command control signal by a transducer or an equivalent component, and sent to BSCU 104. The BSCU pilot command control signal may convey brake pedal sensor data that may include or indicate the deflection position for brake pedal 102, the deflection rate for brake pedal 102, a desired braking condition for brake mechanism 108, or the like.

An embodiment of electric brake system 100 may use any number of BSCUs 104. For ease of description, this example includes only one BSCU 104. BSCU 104 is an electronic control unit that has embedded software that digitally computes EBAC control signals that represent braking commands. The electrical/software implementation allows further optimization and customization of braking performance and brake onset if needed for the given aircraft deployment.

BSCU 104 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, the BSCU 104 employs a computer processor (such as a PowerPC 555) that hosts software and provides external interfaces for the software.

BSCU 104 monitors various vehicle inputs to provide control functions such as, without limitation: pedal braking; parking braking; automated braking; and gear retract braking. It should be noted that BSCU 104 is always on. In addition, BSCU 104 blends antiskid commands (which could be generated internally or externally from BSCU 104) to provide enhanced control of braking. BSCU 104 obtains pilot command control signals from brake pedal 102 (i.e. the pilot controls the brake pedals that the BSCU 104 senses to control the deceleration of the vehicle), along with wheel data (e.g., wheel speed, rotational direction, tire pressure, etc.) from RDC 112, as described in more detail below. As such, BSCU 104 continually monitors any movement of brake pedal 102 along with the speed of wheel 110. It should be noted that although relatively independent of BSCU 104, use of brake pedal 102 is required in order for wheel 110 to skid. In addition, brake pedal 102 has to be applied with a brake pressure greater than the brake pressure required for wheel 110 to skid before antiskid initializes (e.g., before antiskid commands are generated).

Also, BSCU 104 processes its input signals and generates one or more EBAC control signals that are received by EBAC 106. In practice, BSCU 104 transmits the EBAC control signals to EBAC 106 via a digital data bus. In a generalized architecture (not shown), each BSCU can generate independent output signals for use with any number of EBACs under its control.

BSCU 104 may be coupled to one or more associated EBACs 106. EBAC 106 may be implemented, performed, or realized in the manner described above for BSCU 104. In one embodiment, EBAC 106 is realized with a computer processor (such as a PowerPC 555) that hosts software, provides external interfaces for the software, and includes suitable processing logic that is configured to carry out the various EBAC operations described herein. EBAC 106 obtains EBAC control signals from BSCU 104, processes the EBAC control signals, and generates the brake mechanism control signals (brake actuator signals) for brake mechanism 108.

Notably, the functionality of BSCU 104 and EBAC 106 may be combined into a single processor-based feature or component. In this regard, BSCU 104, EBAC 106, or the combination thereof can be considered to be a brake control architecture for electric brake system 100. Such a brake control architecture includes suitably configured processing logic, functionality, and features that support the load alleviation and brake control operations described herein.

Wheel 110 may include an associated brake mechanism 108. EBAC 106 controls brake mechanism 108 to apply, release, modulate, and otherwise control the actuation of one or more components of brake mechanism 108. In this regard, EBAC 106 generates the brake mechanism control signals in response to the respective EBAC control signals generated by BSCU 104. The brake mechanism control signals are suitably formatted and arranged for compatibility with the particular brake mechanism 108 utilized by the aircraft. In practice, the brake mechanism control signals may be regulated to carry out anti-skid and other braking maneuvers. Those skilled in the art are familiar with aircraft brake mechanisms and the general manner in which they are controlled, and such known aspects will not be described in detail here.

Electric brake system 100 may include or communicate with one or more sensors 111 for wheel 110. These sensors 111 are suitably configured to measure wheel data (wheel speed, direction of wheel rotation, tire pressure, wheel/brake temperature, etc.) for wheel 110, where the wheel data can be utilized by electrical braking system 100. RDC 112 is generally configured to receive, measure, detect, or otherwise obtain data for processing and/or transmission to another component of electric brake system 100. Here, RDC 112 is coupled to (or is otherwise associated with) wheel 110, and RDC 112 is configured to collect and transmit its wheel data to BSCU 104. The digital data communication bus or buses on the aircraft may be configured to communicate the wheel data from RDC 112 to BSCU 104 using any suitable data communication protocol and any suitable data transmission scheme. In an alternate embodiment, RDC 112 may be configured to communicate the wheel data to EBAC 106. In yet another embodiment, RDC 112 may be configured to communicate the wheel data to BSCU 104 and EBAC 106.

In this example, electric brake system 100 is suitably configured to control the actuation of brake mechanism 108 in response to the wheel data. In particular, electric brake system 100 is configured to control the actuation of brake mechanism 108 in response to a wheel speed value, which indicates the current speed of the aircraft.

Electric brake system 100 can be utilized to alleviate dynamic structural loads (e.g., landing gear loads) during high effort braking of the aircraft. Electric brake system 100 generally commands brake mechanism 108 to generate brake torque in a manner that is related to the amount that brake pedal 102 is deflected by the pilot. This control can take into account the deflection position of brake pedal 102, the deflection rate of brake pedal 102, and/or the speed at which the aircraft is traveling to modify the actuation of brake mechanism 108 such that the desired brake torque is obtained at a suitable rate that does not develop high peak dynamic loads. This allows the aircraft landing gear to be designed with less weight and bulk, which benefits aircraft performance. In one embodiment, electric brake system 100 uses sensors 103 at brake pedal 102 to measure the deflection and deflection rate of brake pedal 102. BSCU 104 processes these inputs to reduce the initial onset rate of brake application, which in turn reduces the peak brake load that has to be absorbed by the landing gear structure. The brake control laws can be tuned for the particular model of aircraft, static, dynamic, or operational characteristics of the aircraft, and/or static, dynamic, or operational characteristics of brake mechanism 108.

Figure 2:
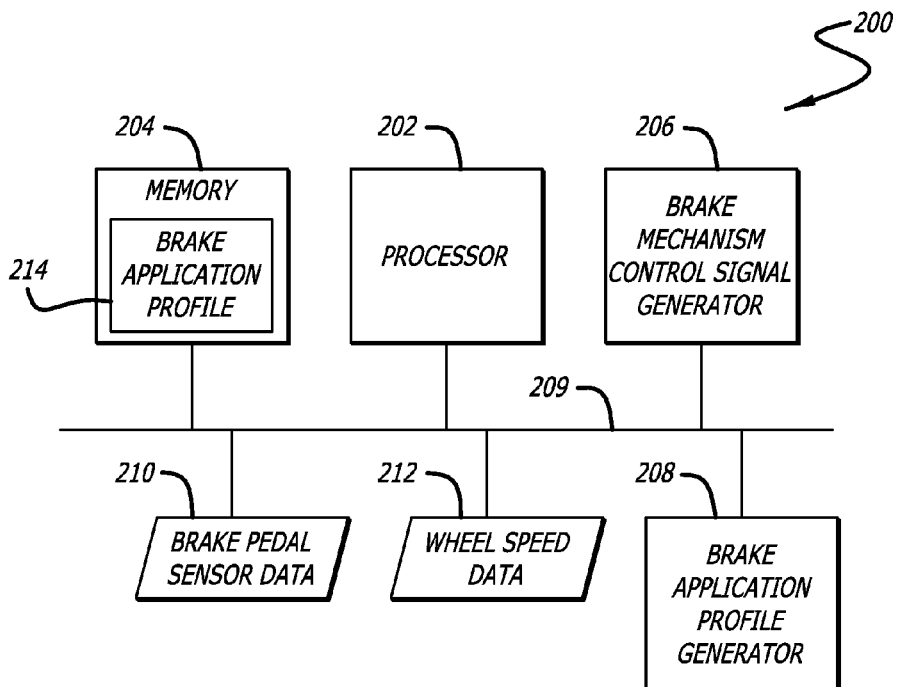
FIG. 2 is a schematic representation of a brake control architecture suitable for use in an electric brake system for an aircraft (i.e. a vehicle) that may be employed by the disclosed system for optimized antiskid control initialization for dry and wet runways as a function of wheel spinup, in accordance with at least one embodiment of the present invention.

FIG. 2 is a schematic representation of a brake control architecture 200 suitable for use in an electric brake system for an aircraft. Electric brake system 100 may employ an embodiment of brake control architecture 200. For example, brake control architecture 200 may be implemented or realized in BSCU 104 and/or EBAC 106. Brake control architecture 200 may include, without limitation: a processor 202 having suitably configured processing logic; an appropriate amount of memory 204; and a brake mechanism control signal generator 206. Brake control architecture 200 may, but need not, include a brake application profile generator 208. These elements may be coupled together using a data communication bus 209 or any suitably configured interconnection architecture or arrangement. In this embodiment, brake control architecture 200 is configured to obtain and process brake pedal sensor data 210 and wheel speed data 212 in the manner described in more detail below.

Processor 202 may be implemented, performed, or realized in the manner described above for BSCU 104. The processing logic corresponding to processor 202 is designed to carry out various operations and functions associated with the electric brake control scheme described herein. Furthermore, a method or algorithm (or portions thereof) described in connection with the embodiments disclosed herein may be embodied directly in hardware, in firmware, in a software module executed by processor 202, or in any practical combination thereof. A software module may reside in memory 204, which may be realized as one or more physical components having RAM memory, flash memory, ROM memory, EPROM memory, EEPROM memory, registers, a hard disk, a removable disk, a CD-ROM, or any other form of storage medium known in the art. In this regard, memory 204 can be coupled to processor 202 such that processor 202 can read information from, and write information to, memory 204. In the alternative, memory 204 may be integral to processor 202. As an example, processor 202 and memory 204 may reside in an ASIC.

Memory 204 may be configured to store at least one brake application profile 214 for the aircraft. Brake application profile 214 influences the manner in which the brake mechanism is actuated. Brake application profile 214 may be predetermined and programmed into brake control architecture 200 or generated in real-time by brake application profile generator 208. In the former situation, brake application profile 214 may be based upon static, dynamic, aerodynamic, operational, and/or other characteristics of the aircraft (e.g., the mass of the aircraft and the typical landing speed of the aircraft) and/or based upon static, dynamic, operational and/or other characteristics of the electric brake system or brake mechanism (e.g., the response time of the control elements, the maximum achievable brake torque, and the typical range of brake torque). In the latter situation, the optional brake application profile generator 208 may be utilized to generate brake application profile 214 dynamically in response to brake pedal sensor data 210 and/or in response to wheel speed data 212. The operation of brake application profile generator 208 may also be influenced by aircraft characteristics and/or brake mechanism characteristics as mentioned above. In practice, brake application profile generator 208 may be realized in the processing logic of processor 202.

Figure 3:
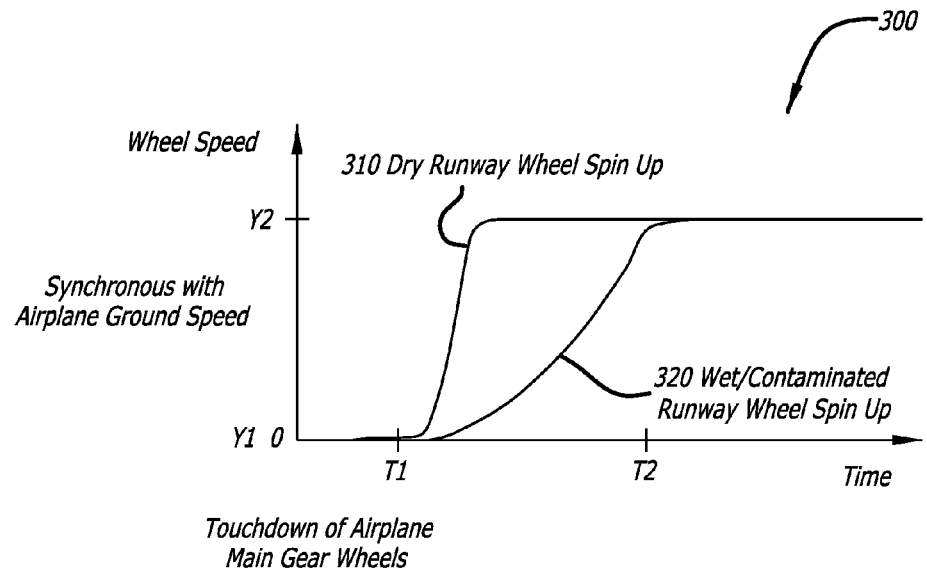
FIG. 3 is a graph showing exemplary wheel speed for an aircraft as a function of time for dry runway conditions and for wet/contaminated runway conditions, in accordance with at least one embodiment of the present invention.

FIG. 3 is a graph 300 showing exemplary wheel speed for an aircraft as a function of time for dry runway conditions 310 and for wet/contaminated runway conditions 320, in accordance with at least one embodiment of the present disclosure. In this figure, the y-axis denotes wheel speed, and the x-axis denotes time. In particular, the graph 300 shows the wheel speed as a function of time for dry runway conditions 310 and for wet/contaminated runway conditions 320 starting from the time T1 the aircraft touches down onto the runway with an initial wheel speed of Y1 (i.e. zero) to the time T2 when reaching the aircraft ground speed Y2 without slippage.

Figure 4:
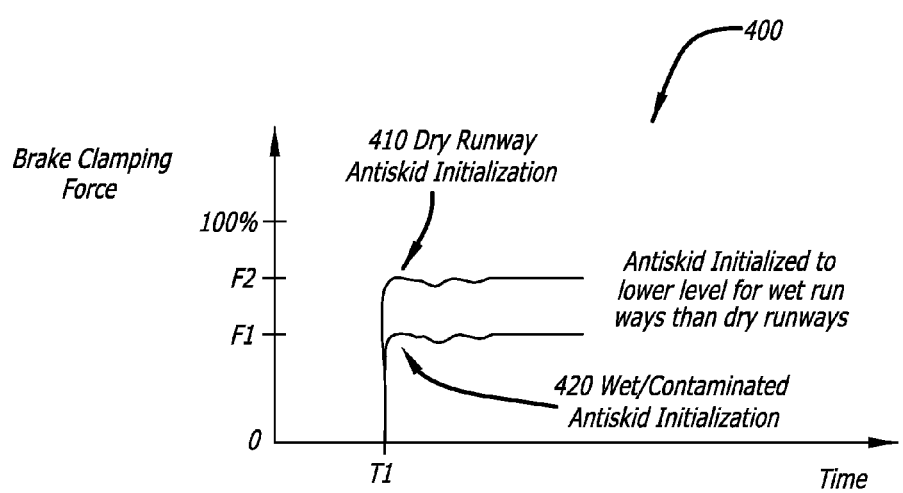
FIG. 4 is a graph illustrating exemplary brake clamping force for an aircraft as a function of time for dry runway conditions and for wet/contaminated runway conditions, in accordance with at least one embodiment of the present invention.

FIG. 4 is a graph 400 illustrating exemplary brake clamping force for an aircraft as a function of time for dry runway conditions 410 and for wet/contaminated runway conditions 420, in accordance with at least one embodiment of the present invention. In this figure, the y-axis denotes brake clamping force, and the x-axis denotes time. Specifically, the graph 400 shows the brake clamping force as a function of time for dry runway conditions 410 and for wet/contaminated runway conditions 420 starting from the time T1 the aircraft touches down onto the runway. The brake clamping force antiskid is initialized to a lower level F1 for wet/contaminated runway conditions. Conversely, the brake clamping force antiskid is initialized to a higher level F2 for dry runway conditions.

FIG. 5 is a flow chart for the disclosed method 500 for optimized antiskid control initialization for dry and wet travel surfaces as a function of wheel spinup, that uses the rate of wheel spin up to estimate the surface condition, in accordance with at least one embodiment of the present invention. At the start 510 of the method 500, at least one processor determines when at least one wheel of the vehicle (e.g., an aircraft) touches the ground by determining, with at least one wheel sensor, the weight on at least one wheel and by determining, with at least one processor, whether the weight on at least one wheel exceeds a weight threshold 520. In one or more embodiments, the weight threshold is related to the size of the vehicle.

If the processor determines that the weight on at least one wheel does not exceed the weight threshold, the method 500 returns to the start 510. However, if the processor determines that the weight on at least one wheel does exceed the weight threshold, the method 500 proceeds to step 530.

Then, at step 530, at least one wheel sensor measures the speed of at least one wheel (e.g., in feet per seconds (ft/sec)) 530. At least one processor then calculates a rate of wheel spin up for at least one wheel (e.g., in feet per seconds squared (ft/sec$^2$)) by using the measured speed of at least one wheel 540.

At least one processor then determines whether the calculated rate of wheel spin up exceeds a wheel spin up rate threshold 550. In one or more embodiments, the wheel spin up rate threshold is around 1000 ft/sec$^2$. If it is determined that the rate of wheel spin up does not exceed the wheel spin up rate threshold, it is assumed that the runway is wet and at least one brake will apply a low level of brake force for at least one wheel 560. In one or more embodiments, the low level of brake force is about 300 to 1500 pounds per square inch (psi). It should be noted that these are typical values for brake pressure reduced by the antiskid system, if it is determined that the runway is wet. In other embodiments, various different values for the low level of brake force may be utilized.

However, if it is determined that the rate of wheel spin up does exceed the wheel spin up rate threshold, it is assumed that the runway is dry and at least one brake will apply a high level of brake force for at least one wheel 570. In one or more embodiments, the high level of brake force is about 1500 to 3000 psi. It should be noted that these are typical values for brake pressure applied by the antiskid system, if it is determined that the runway is dry. In other embodiments, various different values for the high level of brake force may be used. Also, it should be noted that in one or more embodiments, at least one brake is a forward brake and/or an aft brake. Then, the method 500 ends 580.

FIG. 6 is a flow chart for the disclosed method 600 for optimized antiskid control initialization for dry and wet runways as a function of wheel spinup, that uses the time of wheel spin up to estimate the runway condition, in accordance with at least one embodiment of the present disclosure. At the start 605 of the method 600, at least one processor determines when at least one wheel of the vehicle (e.g., an aircraft) touches the ground 615 by determining, with at least one wheel sensor, the weight on at least one wheel and by determining, with at least one processor, whether the weight on at least one wheel exceeds a weight threshold 610. In some embodiments, the weight threshold is related to the size of the vehicle.

If the processor determines that the weight on at least one wheel does not exceed the weight threshold, the method 600 returns to the start 605. However, if the processor determines that the weight on at least one wheel does exceed the weight threshold, the method 600 proceeds to step 615.

At step 615, the processor determines the time T1 when at least one wheel of the vehicle touches the ground, which is indicated by the weight threshold being exceeded. Then, at least one wheel sensor measures the speed of at least one wheel (e.g., ft/sec) 620. At least one processor then determines the ground speed (e.g., ft/sec). 625. Then, at least one processor determines wheel slippage (e.g., ft/sec) by calculating the wheel speed minus the ground speed 630.

At least one processor then determines if the wheel slippage is equal to zero 635. If it is determined that the wheel slippage is not equal to zero, this indicates that the wheel speed is not equal to the ground speed, and the method 600 returns to step 630. However, if it is determined that the wheel slippage is equal to zero, this indicates that the wheel speed is equal to the ground speed, and the method 600 proceeds to step 640.

At step 640, at least one processor determines the time T2 when the wheel speed is equal to the ground speed 640. Then, at least one processor determines a total time T by calculating the time T2 minus the time T1 645.

At least one processor then determines whether the calculated total time T exceeds a time threshold 650. In one or more embodiments, the time threshold is around 0.5 seconds (sec). If it is determined that the total time T does not exceed the time threshold, it is assumed that the runway is wet and at least one brake will apply a low level of brake force for at least one wheel 655. In at least one embodiment, the low level of brake force is about 300 to 1500 pounds per square inch (psi). However, if it is determined that the total time T does exceed the time threshold, it is assumed that the travel surface is dry and at least one brake will apply a high level of brake force for at least one wheel 660. In some embodiments, the high level of brake force is about 1500 to 3000 psi. Then, the method 600 ends 665.

It should be noted that the vehicle employed by the disclosed system, method, and apparatus for optimized antiskid control initialization for travel surfaces in variable conditions as a function of wheel spinup may be an airborne vehicle. In some embodiments, the airborne vehicle may be an aircraft or a space plane. For these embodiments, the forward and aft brakes are associated with at least one landing gear truck containing at least one wheel. It should also be noted that in some embodiments, a vehicle speed sensor(s) (e.g., a sensor (s) that measures linear velocity) may be used instead or in conjunction with a wheel speed sensor(s) (e.g., a sensor(s) that measures rotational velocity). For these embodiments, a vehicle speed threshold value may be utilized as well.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for optimizing real-time antiskid control initialization for a vehicle on a travel surface, the method comprising:
   determining, with at least one processor, a time when at least one wheel of the vehicle touches ground;
   calculating, with the at least one processor, a rate of wheel spin up for the at least one wheel;
   determining, with the at least one processor, whether the rate of wheel spin up exceeds a wheel spin up rate threshold;
   applying, with at least one brake for the at least one wheel, a high level of brake force, when the rate of wheel spin up exceeds the wheel spin up rate threshold; and
   applying, with the at least one brake for the at least one wheel, a low level of brake force, when the rate of wheel spin up does not exceed the wheel spin up rate threshold.

2. The method of claim 1, wherein the determining of the time when the at least one wheel of the vehicle touches the ground comprises:
   determining, with at least one wheel sensor, a weight on the at least one wheel; and
   determining, with the at least one processor, whether the weight on the at least one wheel exceeds a weight threshold.

3. The method of claim 2, wherein the weight threshold is related to a size of the vehicle.

4. The method of claim 1, wherein the method further comprises measuring, with at least one wheel sensor, a speed of the at least one wheel.

5. The method of claim 4, wherein the calculating of the rate of wheel spin up comprises the at least one processor using the speed of the at least one wheel.

6. The method of claim 1, wherein the wheel spin up rate threshold is around 1000 feet per second squared (ft/sec$^2$).

7. The method of claim 1, wherein the high level of brake force is about 1500 to 3000 pounds per square inch (psi).

8. The method of claim 1, wherein the low level of brake force is about 300 to 1500 psi.

9. The method of claim 1, wherein the vehicle is one of an aircraft and a space plane.

10. The method of claim 1, wherein the at least one brake is at least one of a forward brake and an aft brake.

11. A system for optimized antiskid control initialization for a vehicle, the system comprising:
   at least one processor to determine a time when at least one wheel of the vehicle touches ground, to calculate a rate of wheel spin up for the at least one wheel, and to determine whether the rate of wheel spin up exceeds a wheel spin up rate threshold; and
   at least one brake, for the at least one wheel, to apply a high level of brake force when the rate of wheel spin up exceeds the wheel spin up rate threshold, and to apply a low level of brake force when the rate of wheel spin up does not exceed the wheel spin up rate threshold.

* * * * *